Dec. 20, 1966 D. ROSATO ET AL 3,293,337
APPARATUS AND METHOD FOR FILLING A VOID
WITH A RESINOUS FOAM
Filed April 14, 1964 4 Sheets-Sheet 1
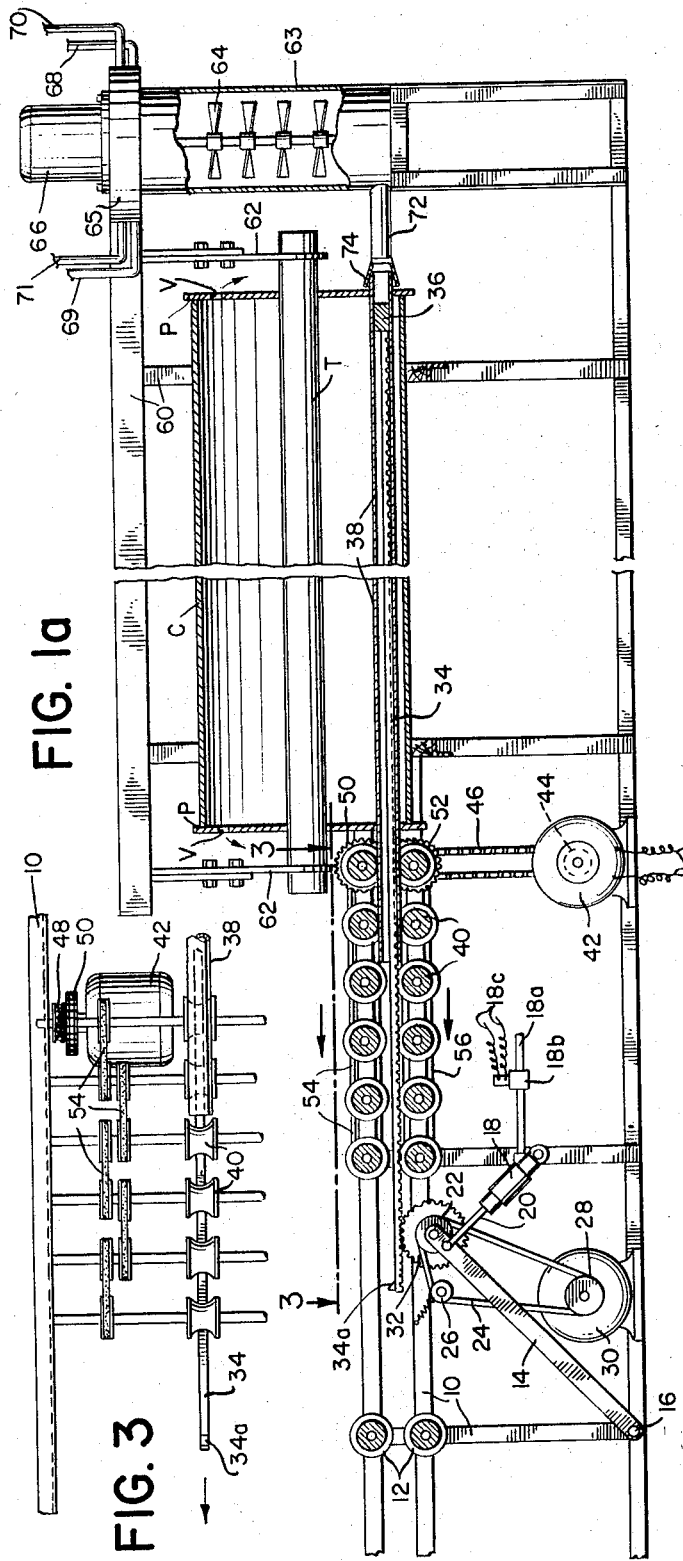
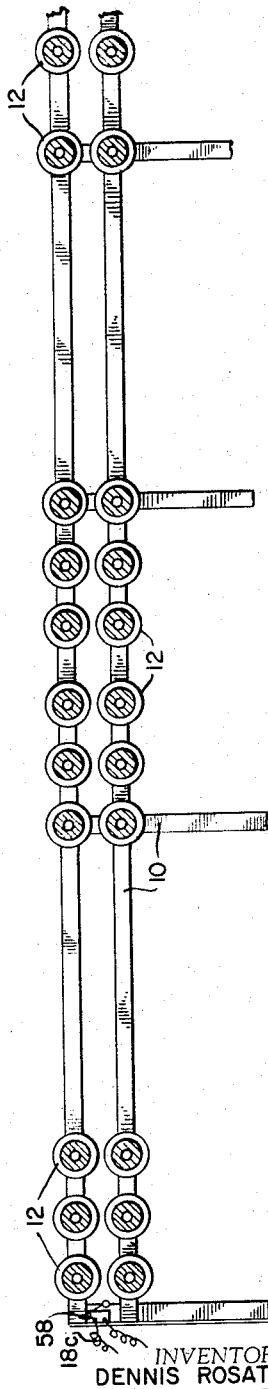
INVENTORS
DENNIS ROSATO
KENNETH SHARTZER
BY
Darby & Darby
ATTORNEYS

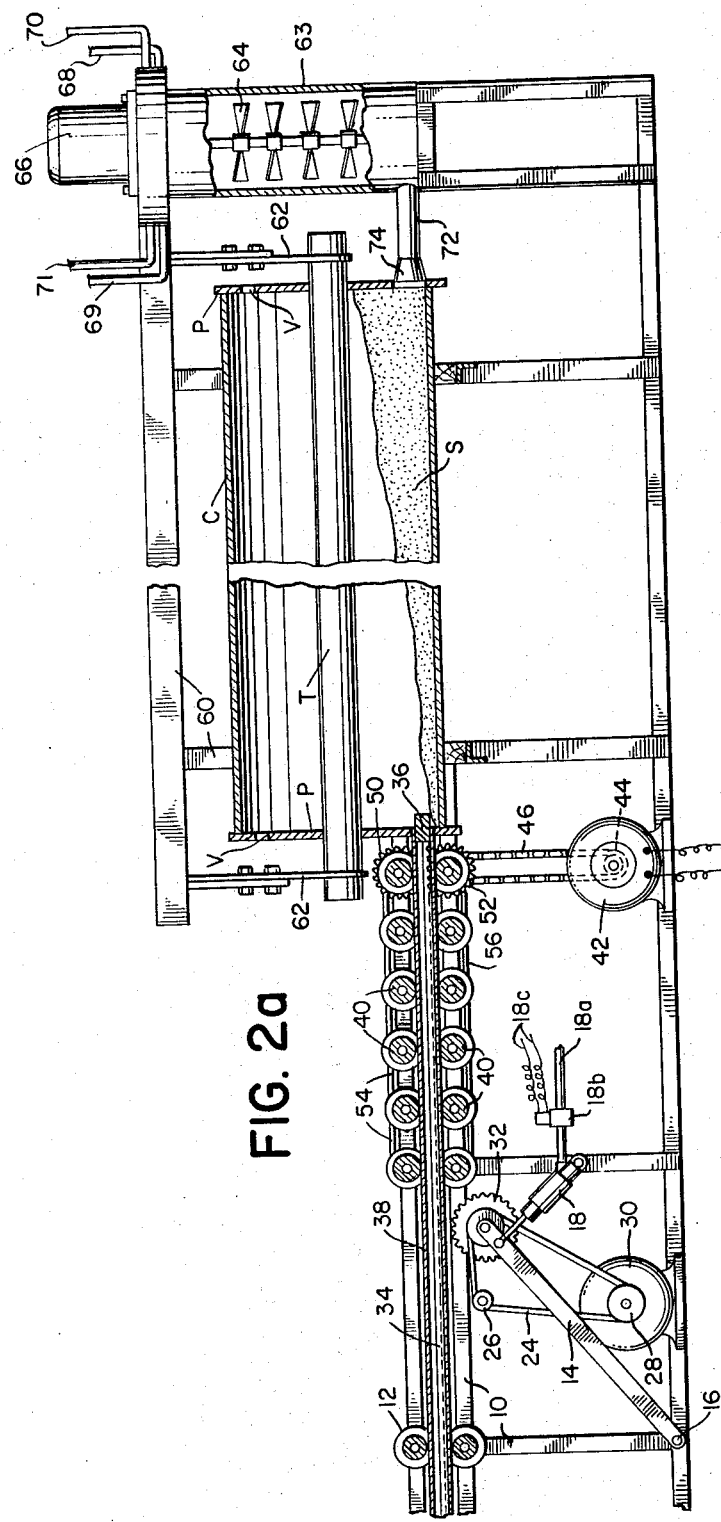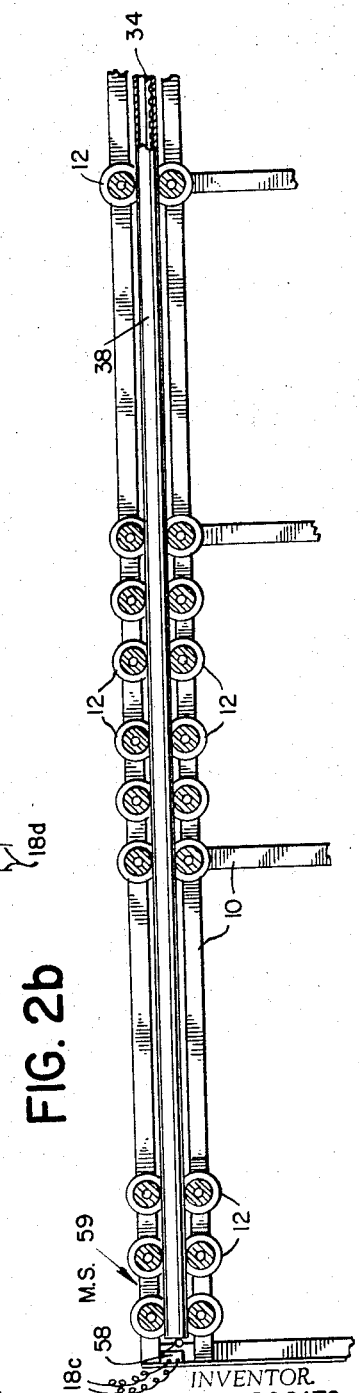

Dec. 20, 1966  D. ROSATO ET AL  3,293,337
APPARATUS AND METHOD FOR FILLING A VOID
WITH A RESINOUS FOAM
Filed April 14, 1964  4 Sheets-Sheet 3
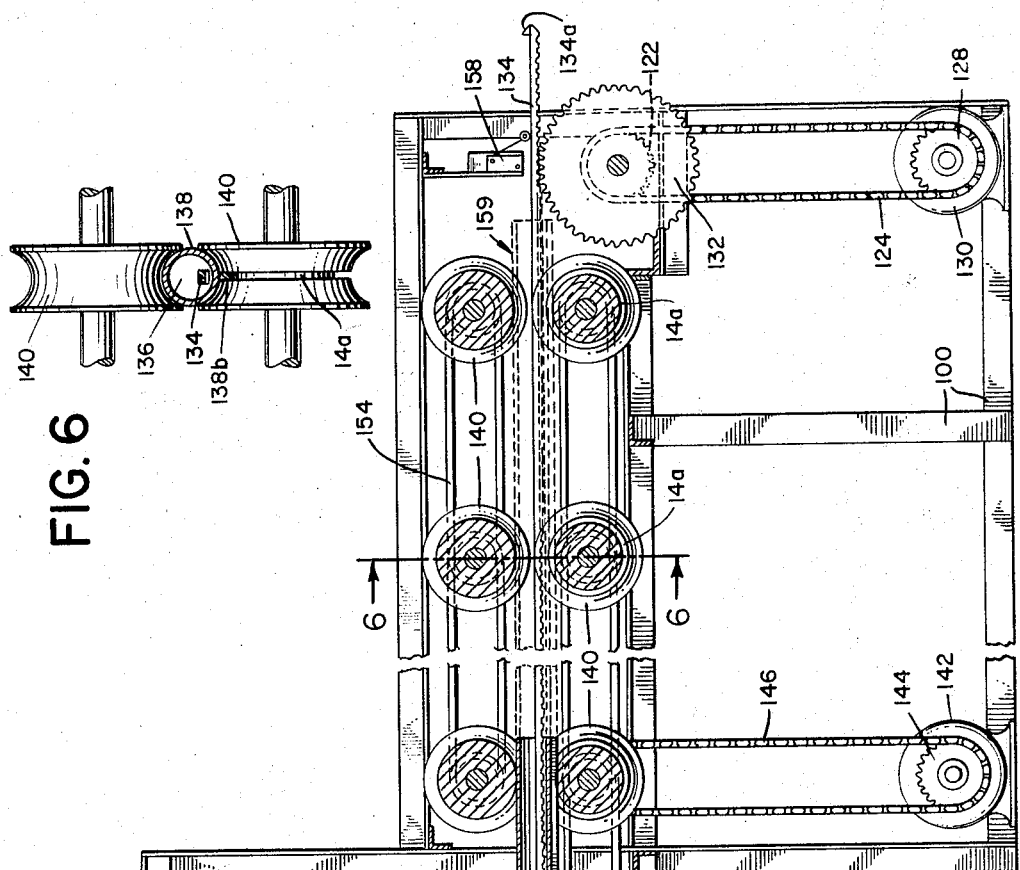
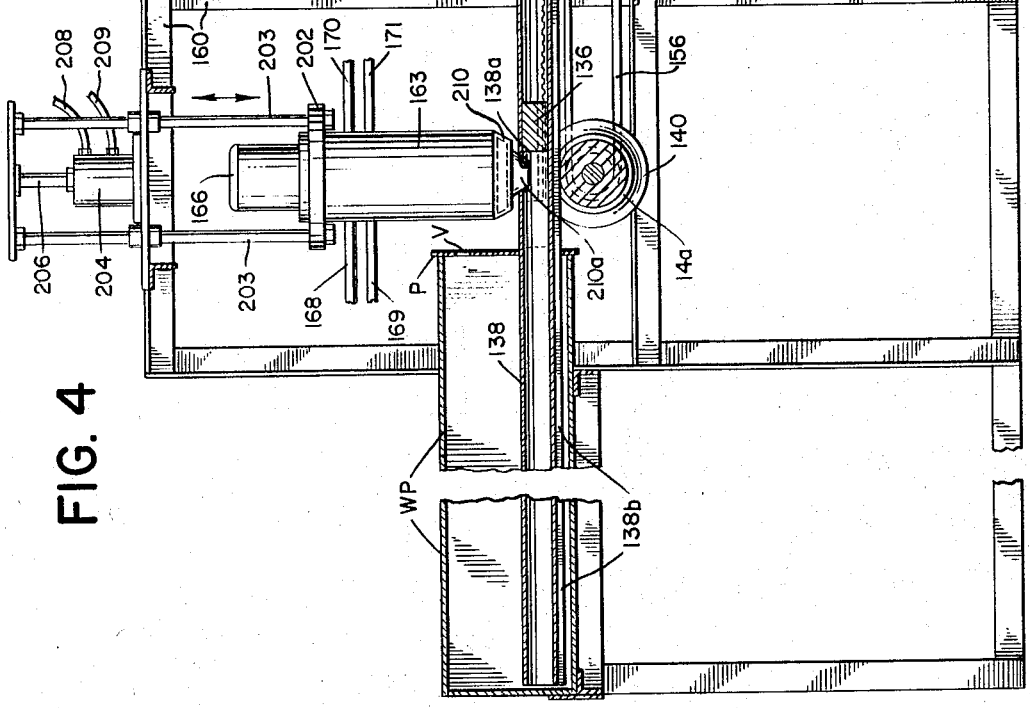

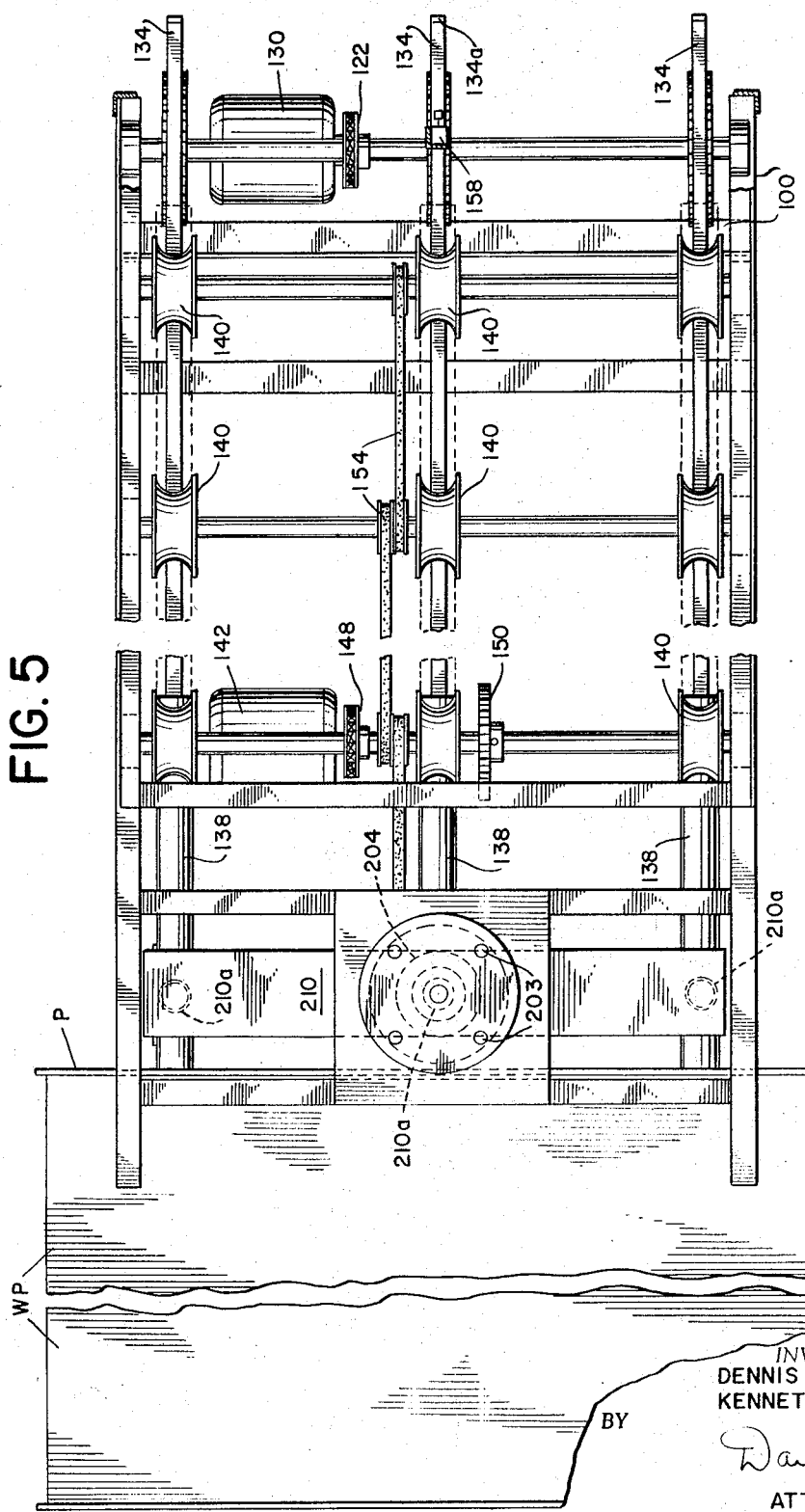

United States Patent Office 3,293,337
Patented Dec. 20, 1966

3,293,337
APPARATUS AND METHOD FOR FILLING A VOID WITH A RESINOUS FOAM
Dennis Rosato and Kenneth Shartzer, Janesville, Wis., assignors to Triangle Conduit & Cable Co., Inc., New Brunswick, N.J., a corporation of Delaware
Filed Apr. 14, 1964, Ser. No. 359,690
5 Claims. (Cl. 264—45)

This invention comprises apparatus and methods, by means of which foamable mixtures can be deposited in a void such as a space defined by a casing so that after the foaming reaction occurs the space is completely and uniformly filled with foam.

The various detailed objects of this invention will be better understood from the following detailed description of a form of apparatus in accordance therewith, selected for disclosure purposes and hereinafter described in detail in connection with the accompanying drawings:

In those drawings:

FIGURES 1a and 1b, taken together, represent a longitudinal central cross sectional view of the machine of this invention on a vertical plane, showing the parts in the position to start the operation;

FIGURES 2a and 2b, taken together, comprise a view similar to that of FIGURES 1a and 1b, differing only in that the parts are shown in the position where the foamable mixture has been deposited in the space to be filled with foam;

FIGURE 3 is a plan view of a detail of the machine viewed substantially from the plane 3—3 of FIGURE 1a;

FIGURE 4 is a longitudinal central vertical cross sectional view through a modified machine, particularly adapted for supplying the foamable mixture to the space to be filled at a plurality of positions;

FIGURE 5 is a top plan view of the modified machine of FIGURE 4;

FIGURE 6 is a detailed cross sectional view taken on the line 6—6 of FIGURE 4.

In practice, various devices and products are presently being manufactured which have a void or space filled with a plastic or resinous foam, such as, for example, a urethane foam. Generally, such products involve a casing which defines the space to be filled. For example, as illustrated in FIGURE 1a, the space may be of annular form, represented, for example, by an outer tube C having a concentric internal tube T defining the annular space to be filled with the plastic foam. Such a product can be, for example, a heat insulated conduit for conducting hot or cold fluids through the tube T. As illustrated in FIGURE 4, the product may consist of a heat insulated panel, which, for example, could form one side of a refrigerator. As illustrated, this panel comprises a rectangular casing WP, defining the space to be completely filled with plastic foam.

The general purpose of this invention is to fill voids or spaces of this type with a uniform filling of plastic foam rapidly and expeditiously at a minimum cost.

As illustrated, the machine of the first embodiment includes a built up framework 10 of suitable size and configuration to support the various elements of the mechanism. As can be seen, this framework is elongated and distributed from the left end towards the right are a series of groups of rollers 12. In each group the rollers comprise pairs positioned with vertical spacing, as shown. In the form illustrated, as depicted in FIGURE 6, these rollers have concave peripheries.

Referring to FIGURE 1a, there is pivotally mounted at 16 a lever 14, on the upper end of which is journaled a gear 32. This gear is driven by a motor 30, on whose shaft is mounted a pulley 28. This pulley is connected by a belt 24 to a corresponding pulley 22 on the shaft of the gear 32. The belt 24 passes around a resiliently supported idler pulley 26. The lever 14 is caused to pivot about the axis 16, by means of a pressure fluid engine 18. The piston rod 20 of this engine is pivotally connected to the upper end of the lever 14 as shown. As diagrammatically illustrated, the fluid, which may be compressed air, is delivered to and exhausted from the cylinder of the engine 18 through a pipe 18a. In this pipe is an electromagnetically operated supply and exhaust valve 18b. The circuit connections for the magnet valve are shown at 18d.

A series of roller pairs 40, similar to the roller pairs 12, are arranged in a bank, as shown, but in this case are power driven. The drive for these rollers comprises an electric motor 42 having a sprocket wheel 44 on its shaft, which is connected by a chain belt 46 to a sprocket wheel 48, see FIGURE 3, on the upper shaft of the right hand pair of rollers 40. Mounted on this shaft is a gear 50 which meshes with a gear 52, see FIGURE 1a, mounted on the lower shaft of this pair. As shown in FIGURE 3, the upper shafts of the pairs of rollers 40 are interconnected by a series of belts and pulleys 54, see FIGURE 3. The lower shafts of each pair are similarly connected by belts 56, see FIGURE 1a. It will be apparent with this arrangement that the upper rollers 40 of the pairs rotate in the opposite direction with respect to the lower rollers of each pair. These rollers have concave peripheries, as in the case of the rollers 12.

Engaged by the rollers 40 is a circular tube 38, into which extends a toothed rack 34 having a piston 36 at the right hand end. For clarity, it is noted that the rollers are in peripheral outline arcuate, so as to frictionally engage the surface of the tube 38, as indicated in FIGURE 6. Mounted on the other end of the rack 34 is an abutment 34a, positioned to actuate, as will be explained, a control switch 58, see FIGURE 1b, at the left hand end of the framework 10. This switch is in the circuit including the wires 18c.

The framework 10 has an upper framework 60 provided with supporting brackets 62, which depend therefrom.

At the right hand end of the machine is a mixing and pumping device 63 for supplying the foamable resin to the machine. This device includes a rotor 64. The rotor 64 is driven by a suitable motor 66, which may be electric. The motor 66 sits on a mixing head 65, to the interior of which are the pipe connections 68 and 70. The pipe connections 69 and 71 provide return lines for the chemical constituents of the foamable mixture as commonly used in "on and off" machines of this kind. At the lower end of the device 63 is an outlet conduit 72 having a conical nozzle 74, into which the end of the tube 38 fits, as shown.

The ends of the tube C are preferably covered by plates P to prevent loss of foamable mixture and over expansion thereof out of the ends of the tube. These plates of course have holes for the tube 38 and venting holes V near the top, as shown.

In describing the operation of this machine it will be assumed that the product being made is a heat insulated conduit comprising an outer casing or tube C and an inner fluid conduit T. The frame is constructed so that the casing C rests in the position shown and the tube T is supported concentrically thereof by the brackets 62. With the rotor 64 operating the constituent ingredients of the foamable mixture are supplied to the manifold 65 by opening the valves, not shown, in the pipes 68 and 70. Measured quantities of these ingredients are thus fed into the area of operation of the rotor 64, where they are blended and by means of which they are pumped through the outlet 72 into the end of the tube 38 through the nozzle 74.

In passing it is noted that the art of preparing suitable foamable mixtures is highly developed. This, as is well understood, includes the selection of the proper constituents of the mixture in relation to the desired characteristics of the final product and in relation to the reaction time of the ingredients, so that the reaction of the ingredients is delayed for the proper time period.

With the circuit 18c energized through the switch 58, pressure fluid will be supplied to the engine 18, so as to move the gear 32 into engagement with the toothed racks 34. With the motor 30 running, the rack 34 will be slowly moved to the left, retracting the piston 36 from the initial position shown in FIGURE 1a. As will be understood, the rate of movement of the piston will be synchronized with the rate of feed of the foamable mixture into the tube 38, so that the volume in the tube to receive the mixture will increase uniformly and at approximately the same rate or slightly faster than the rate at which the mixture is fed into the tube. In simpler language, the piston 36 forms a wall, which recedes at about the same rate as the mixture advances.

When the piston reaches the position shown in FIGURE 2a, the rack will actuate the switch 58 and break the circuit to the magnet valve 18b. This will open the cylinder of the engine 18 to exhaust and the gear will disengage the rack, the air engine being of the well known return type. As soon as the rack stops, the motor 42 is energized to cause the roller pairs 40 to revolve in a direction so as to slowly withdraw the tube 38 from the position shown in FIGURE 1a to the position shown in FIGURE 2a. During the movement of the tube 38 the piston 36 stands still, with the result that as the tube travels to the left the mixture with which it was filled is ejected along a line onto the adjacent inner face of the casing C. This condition is diagrammatically illustrated at S in FIGURE 2a. Applicant has also tried tried to diagrammatically illustrate the fact by showing the decreasing depth of the strip of material S from the right to the left, that the reaction between the ingredients of the mixture is beginning. That is, the foam is beginning to generate exothermic heat, causing expansion of the material so that ultimately it will fill the entire annular space formed by the casing C into the concentric tube T. It will be apparent that the various time factors involved can be adjusted and controlled so as to render the operation efficient.

When the tube 38 has been withdrawn to the position shown in FIGURE 2a, it will actuate a control switch 59 so as to interrupt the circuit 18d to shut off motor 42. At this point it will be noted, as those skilled in the electrical art will understand, that all these operations can be made fully automatic, that is, the control of the engine 18, the motors 30, 42 and 66, and the flow of chemicals through the pipes 68 and 70. It will be understood, of course, that the supply of chemicals through the pipes 68 and 70 will be cut off, so that the mixing and pumping rotor 64 will have delivered the predetermined charge completely to the tube 38, so that there will be no chemical mixture left in the device 63.

When the mixture has fully expanded the annular space will be full and the resulting product can then be removed from the machine.

As is well understood in the art, provision should be made to solvent wash and air dry the portions of the device 63 and nozzle 72 after each use as is common in using "on and off" foam dispensing machines.

The form of the device shown in FIGURES 4 to 6 inclusive is basically the same as the machine just described, but illustrates a variant which is useful for some types of products. In this case the product is assumed to be a casing WP, which can be an elongated rectangular structure, such as the panel of a refrigerator. The panel casing in this case is to be completely filled with foam. This machine includes a suitable framework 100, on which are rotatably supported a plurality of vertically spaced power driven rollers 140. These rollers are driven by an electric motor 142, having a drive sprocket 144 connected by a chain 146 to a sprocket 148 on one of the shafts of one of the pairs of rollers. The upper shafts are, as before, interconnected by a series of pulleys and belts 154. The driven upper shaft is provided with a gear 150, meshing with a gear, not shown, on the lower shaft of the pair (similar to the arrangement shown in the previously described machine). The lower shafts of the pairs are interconnected by pulleys and belts 156, see FIGURE 4.

The peripheries of the rollers 140 are concave, see FIGURE 6, so as to provide driving engagement with the tube 138. Extending longitudinally of this tube is the rack 134 having the switch operating abutment 134a at one end. This rack is connected at its other end to the piston 136 within the tube 138. The rack is reciprocated back and forth as before, by means of a motor 130 driving a sprocket wheel 128, which is connected by a chain 124 to a sprocket 122 on the same shaft with the gear 132. This gear engages the teeth of the rack, as shown in FIGURE 4. The limit switch 158 is provided as in the previous case. In this arrangement the tube 138 is provided with a longitudinally extending fin 138b, arranged to travel in the grooves 140a in the lower rollers 140 of each pair. This fin is provided to prevent the tube 138 from rotating on its axis.

Supported on the upper portion 160 of the frame is a mixing and pumping device 163, similar to that of the previous arrangement and provided with the driving motor 166. In this case, however, the device 163 and its motor 166 is mounted on a plate 202, which is supported by a pair of vertically slidable rods 203 on a double acting fluid pressure engine 204. The piston rod 206 of this engine is connected to the rods 203, as shown. The supply and exhaust connections 208 and 209 are for supplying and exhausting pressure fluid to and from the respective ends of the cylinder of the engine 204. The pipes 168, 169, 170 and 171, as before, are for supplying measured quantities of the chemicals of the foamable mixture to the device 163 and recycling the excess.

As is better seen in FIGURE 5, the outlet from the mixing and pumping device 163 is connected to a transversely extending manifold 210, which is provided with three transversely spaced nozzles 210a.

As will be seen from FIGURE 5, there are actually, in the case illustrated, three transversely spaced sets of rollers 140, three tubes 138 and three toothed racks 134. As indicated in FIGURE 4, each tube 138 is provided with an aperture 138a, into which the related nozzles 210a extend when the tubes 138 are in their left hand position, as indicated in FIGURE 4. In this position each of the pistons 136 is just to the right of the associated aperture 138a, see FIGURE 4.

In the operation of this device, assuming that the parts are in the position shown in FIGURE 4, measured quantities of the chemical ingredients of the foam mixture are supplied through the pipes 168 and 170 to the mixing and pumping device 163. The excess of ingredients will be returned to their supply sources through the pipes 169 and 171. This device will blend and force the mixture into and through the manifold 210 and through the nozzles 210a into each of the three tubes 138. In this arrangement the piston stands still and the mixture fills the left hand end of the tubes 138. When the required quantity of mixture has been filled into these tubes, the engine 204 is energized to raise the mixing device 163 and the attached manifold 210, so as to withdraw the nozzles 210a from the apertures 138a. Thereupon the motor 130 is energized to move the rack and its attached piston 136, so as to lie to the left of the aperture 138a, as shown in dotted lines in FIGURE 4. When the pistons reach this position the switch 158, which is the circuit of the motor 130, is actuated to stop the motor. Motor 142 is then energized to drive all of the roller sets 140 in a direction to slowly move the tubes 138a from the position shown in FIGURE 4 to the right until they are withdrawn from the casing WP. As a result the chemical mixture in the tubes 138 is ejected from their left hand ends and deposited in strips along the inner wall of the casing WP. When the tubes 138 are fully withdrawn they actuate a control switch 159, which stops the motor 142. The three deposited strips of foamable mixture then begin to react and ultimately fill the space defined by the casing WP with foam. Here again, a closure plate, not shown, for the open end of the casing WP can be provided so that the mixture will not expand through the open end of the casing.

It is apparent that on the processing of the next casing the parts will be returned to the position shown in FIGURE 4 to start the cycle over again.

It is noted that one of the functions of the pistons 36 and 136 is to wipe the interior of the tubes 38 and 138 clean, free of the foamable mixture, so that each cycle can be repeated without the delay of cleaning the tubes.

It will be apparent that by proper timing of the operations the recycling of the machine can be reduced to a minimum time period.

By the above disclosure it will be apparent to those skilled in the art that the subject matter of this invention can be varied substantially in its detail without departing from the novel subject matter defined in the appended claims. It is intended that the embodiments selected for illustrative purposes be accepted in that sense, the scope of protection afforded hereby being determined by the claims.

What is claimed:

1. A method of filling the space within a casing with a foamed resinous body, comprising delivering a measured mass of a foamable resinous mixture into an enclosure extending longitudinally of the space defined by a casing, said enclosure having an end movable relative thereto, withdrawing said enclosure while maintaining said end in fixed position relative to said casing to deposit said mass along one wall of said casing and timing said deposit to permit said resinous mixture to react substantially immediately subsequent to completion of said deposit and foam and expand to fill said space.

2. In the method of claim 1, said resinous mixture being deposited on said wall as a strip.

3. An apparatus for filling the space within a casing with a foamed resinous mixture, comprising means for supporting the casing, means for positioning a tube within said casing to lie longitudinally of one wall thereof, a piston slidable in said tube, means for delivering a measured quantity of a foamable resinous mixture into said tube toward one end thereof, means for moving said piston away from said end to a fixed position, means for withdrawing said tube from said casing to cause the fixed piston to deliver said mixture into said space, and means timing said delivery relative to the reaction time of said foamable mixture to cause foaming of said mixture immediately subsequent to said delivery to thereby cause said mixture to expand and fill said space.

4. An apparatus for filling the space within a casing with a foamed resinous mixture, comprising means for supporting the casing in a fixed position, means for positioning a tube within said casing to lie longitudinally of and coextensively of a wall, a piston slidable in said tube, means for delivering a measured quantity of a foamable resinous mixture into one end of said tube, means for moving said piston away from said tube end to a fixed position at the other end of said tube as said mixture is delivered into the tube, means for withdrawing said tube from said casing to cause the fixed piston to deliver said mixture into said space, means timing said withdrawal of said tube from said casing relative to the initiation of reaction between the constituents of said foamable mixture to deliver said mixture immediately prior to reaction to thereby cause said mixture to expand and fill said space.

5. An apparatus for filling the space within a casing with a foamed resinous mixture, comprising means for supporting the casing, means for positioning a tube and an aperture therein within said casing to lie along one wall thereof, a piston in said tube positioned to one side of said aperture, means for delivering a measured quantity of a foamable resinous mixture into said tube through said aperture, means for moving said piston to the other side of said aperture, means for withdrawing said tube from said casing to cause the fixed piston to deliver said mixture into said space, means timing said withdrawal of said tube from said casing relative to the initiation of reaction between the constituents of said foamable mixture to deliver said mixture immediately prior to reaction to thereby cause said mixture to expand and fill said space.

References Cited by the Examiner

UNITED STATES PATENTS

| | | | |
|---|---|---|---|
| 1,457,185 | 5/1923 | Nichols | 264—311 XR |
| 2,334,294 | 11/1943 | Stevens | 25—38 |
| 2,425,270 | 8/1947 | Skipper | 264—312 XR |
| 3,012,922 | 12/1961 | Wiltshire | 264—311 XR |
| 3,052,927 | 9/1962 | Hoppe et al. | 264—36 |
| 3,090,078 | 5/1963 | Ackles | 264—45 |
| 3,206,821 | 9/1965 | Keyser et al. | 264—270 XR |

ALEXANDER H. BRODMERKEL, *Primary Examiner.*

P. E. ANDERSON, *Assistant Examiner.*